United States Patent
Fan et al.

(10) Patent No.: US 7,651,173 B2
(45) Date of Patent: Jan. 26, 2010

(54) WHEEL ISOLATOR COUPLING

(75) Inventors: Xinjian Fan, Novi, MI (US); Jing Yuan, Rochester Hills, MI (US); George Vidican, Rochester Hills, MI (US)

(73) Assignee: The Gates Corporation, Denver, CO (US)

( * ) Notice: Subject to any disclaimer, the term of this patent is extended or adjusted under 35 U.S.C. 154(b) by 174 days.

(21) Appl. No.: 11/825,009

(22) Filed: Jul. 3, 2007

(65) Prior Publication Data
US 2009/0011842 A1 Jan. 8, 2009

(51) Int. Cl.
*B60B 27/04* (2006.01)

(52) U.S. Cl. .................... 301/110.5; 464/76
(58) Field of Classification Search ............. 464/73, 464/76, 81, 83; 301/110.5; 180/219; 474/94
See application file for complete search history.

(56) References Cited

U.S. PATENT DOCUMENTS

| | | | | |
|---|---|---|---|---|
| 3,747,720 A | * | 7/1973 | Jensen | 464/76 |
| 4,194,373 A | | 3/1980 | Jennings et al. | 64/14 |
| 4,307,584 A | * | 12/1981 | Sandiumenge | |
| 4,328,879 A | * | 5/1982 | Tone | 180/219 |
| 4,486,183 A | | 12/1984 | Posiviata et al. | 474/94 |
| 4,794,998 A | | 1/1989 | Iwai et al. | 180/219 |
| 5,240,087 A | | 8/1993 | Parker | 180/231 |
| 5,531,642 A | * | 7/1996 | Shiomi et al. | 464/85 |
| 5,788,576 A | | 8/1998 | Varin | 464/83 |
| 6,516,912 B2 | * | 2/2003 | Iwai et al. | 464/73 |
| 6,719,637 B1 | | 4/2004 | Greene | 464/182 |
| 6,857,976 B2 | | 2/2005 | Kodama et al. | 474/94 |
| 7,101,296 B1 | | 9/2006 | Cass et al. | 474/152 |

FOREIGN PATENT DOCUMENTS

| | | |
|---|---|---|
| DE | 25 46 804 | 4/1977 |
| DE | 93 11 664.0 | 9/1993 |
| WO | 1997/43564 | 11/1997 |
| WO | 2008/115313 | 9/2008 |

* cited by examiner

*Primary Examiner*—Greg Binda
(74) *Attorney, Agent, or Firm*—J. A. Thurnau, Esq.; J. L. Mahurin, Esq.; P. N. Dunlap, Esq.

(57) ABSTRACT

A wheel isolator coupling comprising a sprocket for engaging a drive member, the sprocket fixedly connected to a first adaptor, the sprocket rotationally engaged with a shaft through a first bearing, a wheel portion fixedly connected to a second adaptor, the wheel portion rotationally engaged with the shaft through a second bearing, the first adaptor having at least one receiving portion, at least one compressible member disposed within the receiving portion, the second adaptor having a radially extending member for engaging the compressible member within the receiving portion, and the sprocket imparting no axial force to the first bearing.

5 Claims, 9 Drawing Sheets

WHEEL ISOLATOR COUPLING

FIELD OF THE INVENTION

The invention relates to a wheel isolator coupling, and more particularly, to a wheel isolator coupling comprising a sprocket which imparts no axial force to a sprocket bearing.

BACKGROUND OF THE INVENTION

Isolators are used in motorcycle rear wheel drives in order to reduce the noise, vibration and harshness (NVH) that may otherwise be transmitted to the rider.

Prior art couplings transmit axial loads from the sprocket to wheel shaft bearings due to the means of containing the vibration isolating materials within the sprocket hub. Axial loads can cause premature failure of the wheel bearings.

Representative of the art is U.S. Pat. No. 5,240,087 (1993) which discloses a one-sided rear swing arm suspension system for a motorcycle having a chain-driven rear wheel, in which the tension of the drive chain may be adjusted without affecting the ride height of the motorcycle. The suspension system includes a rear swing arm that is pivotably attached to the body of the motorcycle, and which extends rearwardly around and alongside the rear wheel. The rear end of the swing arm includes elongate recesses which guide and receive an adjustment yoke. The rear wheel is journalled on a spindle that extends transversely from the adjustment yoke. The yoke is positionable longitudinally on the swing arm by means of an adjustment stud extending from the swing arm, and a corresponding adjustment nut entrapped in the neck of the yoke. A single adjustment clamp nut on the end of the spindle operates to secure the spindle to the yoke and to also secure the yoke to the swing arm at a selected position corresponding to a desired chain tension.

Reference is also made to copending U.S. patent application Ser. No. 11/726,091 filed Mar. 21, 2007, published as U.S. Patent Application Publication No. 2008/0234080 A1, directed to a wheel isolator.

What is needed is a wheel isolator coupling comprising a sprocket which imparts no axial force to a sprocket bearing. The present invention meets this need.

SUMMARY OF THE INVENTION

The primary aspect of the invention is to provide a wheel isolator coupling comprising a sprocket which imparts no axial force to a sprocket bearing.

Other aspects of the invention will be pointed out or made obvious by the following description of the invention and the accompanying drawings.

The invention comprises a wheel isolator coupling comprising a sprocket for engaging a drive member, the sprocket fixedly connected to a first adaptor, the sprocket rotationally engaged with a shaft through a first bearing, a wheel portion fixedly connected to a second adaptor, the wheel portion rotationally engaged with the shaft through a second bearing, the first adaptor having at least one receiving portion, at least one compressible member disposed within the receiving portion, the second adaptor having a radially extending member for engaging the compressible member within the receiving portion, and the sprocket imparting no axial force to the first bearing.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

The inventive motorcycle wheel isolator coupling significantly reduces the noise, vibration and harshness (NVH) associated with prior art motorcycle rear wheel drive systems. The benefit of the isolator coupling manifests best during dynamic transient events, namely transmission speed shifting, the high speed downshifting, and the hard launch from a full stop. In these events, the impact shock load (torque) is absorbed by the soft rubber cushion.

Figure 1:
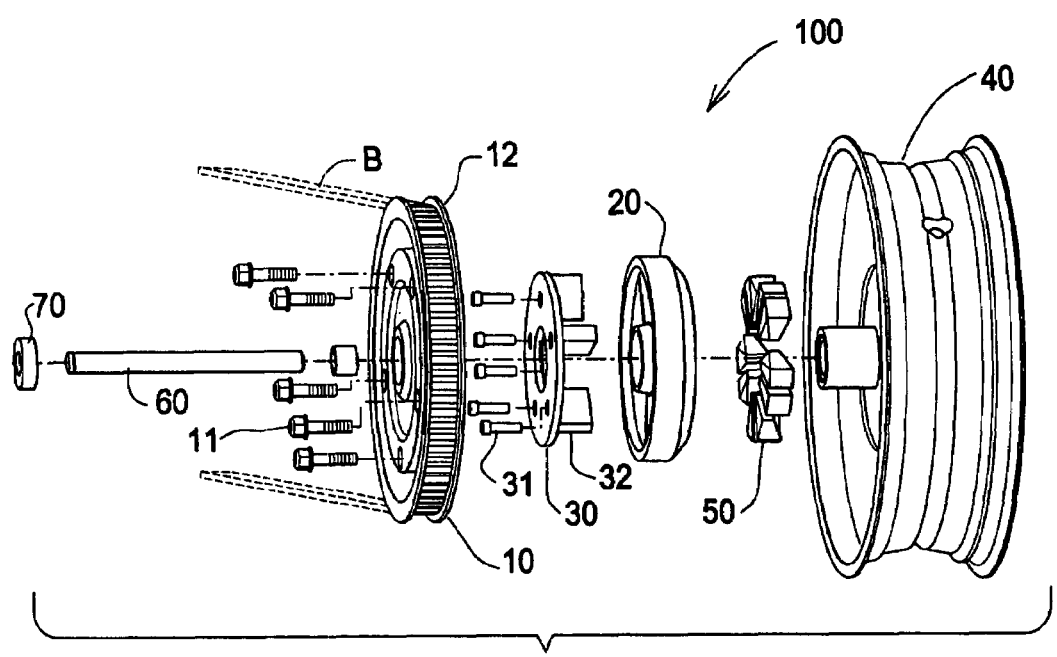
FIG. 1 is an exploded view of the isolator coupling.

FIG. 1 is an exploded view of the isolator coupling. Coupling 100 comprises the sprocket 10. Sprocket 10 is connected to sprocket adaptor 20 using bolts 11. Sprocket adaptor 20 comprises receiving portions 21. The sprocket assembly (10, 11, 20) is not directly attached to the wheel 40.

Wheel adaptor 30 is connected to wheel 40 by bolts 31. Wheel 40 is typically a part of a motorcycle rear suspension which includes a swing arm (not shown). Wheel shaft 60 is typically connected to the swing arm. A drive member, namely, a toothed belt B engages toothed belt engaging surface 12 of sprocket 10. Toothed belts are known in the art. Belt B transmits torque from an engine transmission sprocket (not shown) to the sprocket 10 which turns wheel 40 thereby driving the motorcycle forward. A tire (not shown) is mounted to wheel 40. The tire contacts the ground.

Wheel adaptor 30 comprises planar radial members 32 which extend radially outward from the center of member 30. Members 32 cooperatively engage into receiving portions 21 of sprocket adaptor 20.

Disposed between members 32 and within receiving portions 21 are spaces into which are disposed elastic blocks 50.

This arrangement contains any elastic block expansion in the axial direction between the wheel 40 and wheel adaptor 30. During assembly when wheel adaptor 30 is bolted onto the wheel 40, the force of axial expansion of the elastic blocks 50 is canceled out to each other, therefore results the zero axial force applied onto the sprocket bearing 70. Axial force is parallel to the wheel shaft (axle) 60. This is a significant improvement over conventional isolator coupling design. In particular, with this design a single deep grooved ball bearing 70 may be used instead of the double row ball bearing used commonly in the sprocket necessary to survive the high axial force associated with the prior art coupling.

Elastic blocks 50 are compressible to dissipate energy during operation. Elastic blocks 50 comprise any material known in the art suitable for the service. Elastic blocks 50 may comprise those disclosed in co-pending U.S. application Ser. No. 11/726,091 filed Mar. 21, 2007, published as U.S. Patent Application Publication No. 2008/0234080 A1, incorporated herein in its entirety by reference.

The isolator coupling is a self contained, standalone unit. It does not rely on the form of the mated parts (i.e. wheel or sprocket) as a part of the isolator assembly. Therefore, it is possible to use the inventive isolator coupling as a 'standard' isolator unit that may be used on different motorcycle platforms and applications.

Figure 2:
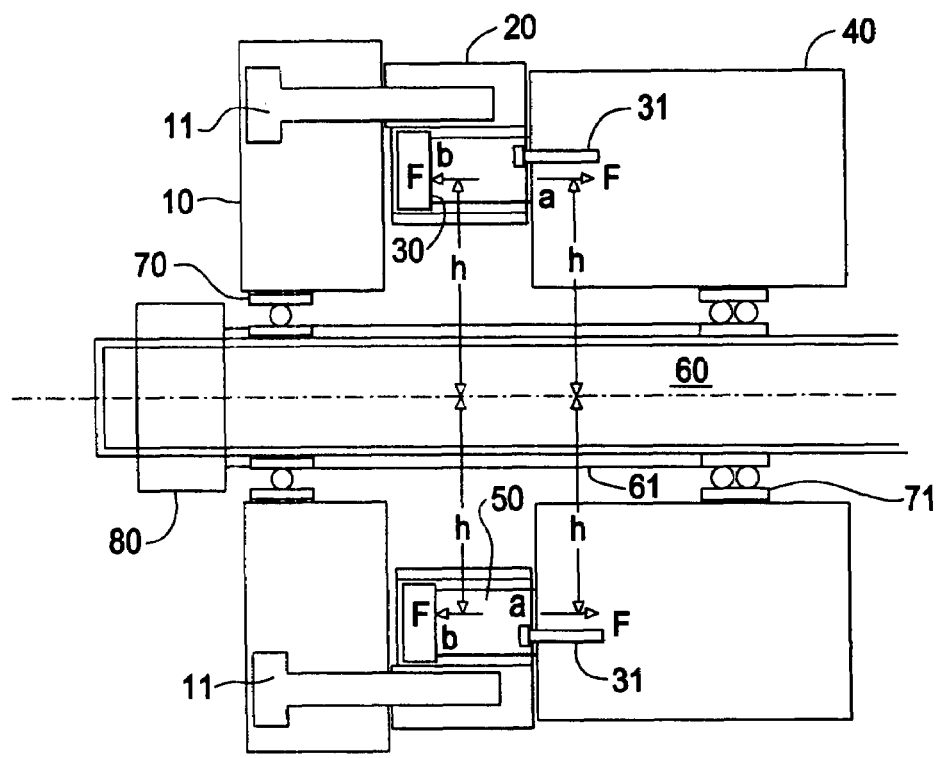
FIG. 2 is a cross-sectional view of the isolator coupling.

FIG. 2 is a cross-sectional view of the isolator coupling. Wheel adaptor 30 is bolted to wheel 40. Sprocket adaptor 20 is bolted to sprocket 10. Blocks 50 are disposed between wheel adaptor 30 members 32 and sprocket adaptor 20. The wheel is held in mechanical, torsional engagement with the sprocket solely by the blocks. There is no "hard" bolted connection between the sprocket and the wheel.

The wheel and sprocket are engaged with the wheel shaft 60 by bearings 70, 71. A bearing raceway spacer 61 keeps the proper spacing between bearings 70, 71. Nut 80 retains the wheel on the axle.

Bearing 70 is preferably a single groove ball bearing. Bearing 71 is a dual groove ball bearing.

Blocks 50 exert a vector force pair (F) along the axial direction. One force of the pair is applied to the wheel at the contact point "a". The other force is applied at the wheel adaptor 30 at the contact point "b" in the opposite direction.

The overall net effect of the forces:

$$\Sigma F = F - F = 0$$

The overall net effect of the moments:

$$\Sigma M = F*h - F*h = 0$$

Therefore, there is neither axial force nor moment effect to the sprocket bearing 70 caused by the rubber block expansion in the axial direction. The axial direction is parallel to the wheel shaft 60, which is also the axis of rotation.

Figure 15:
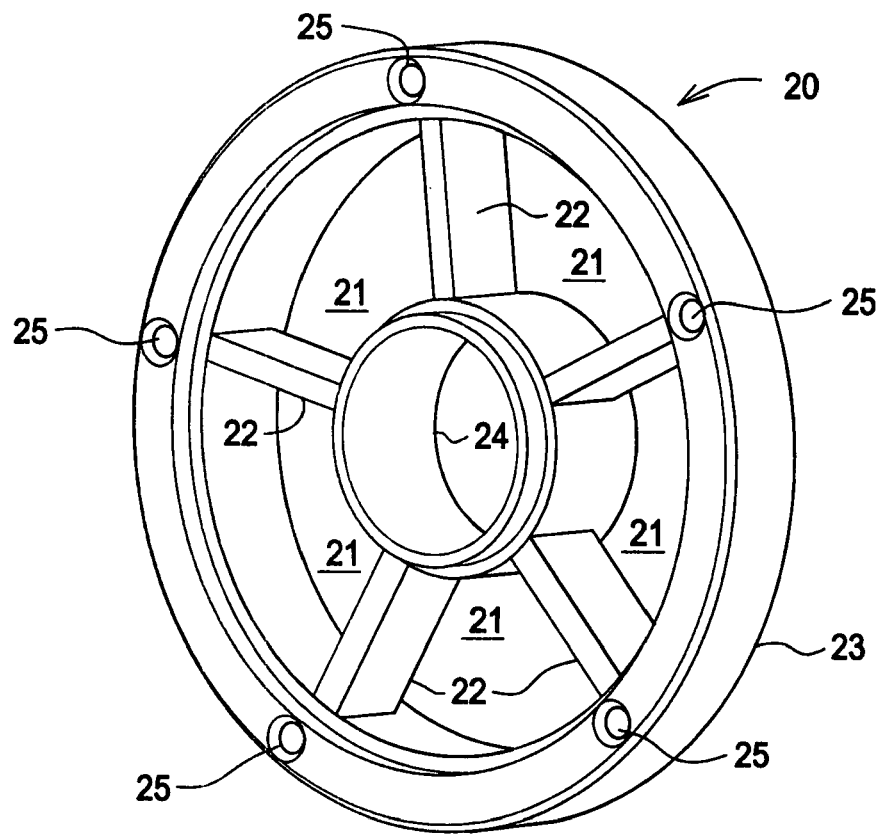
FIG. 15 is a detail is the sprocket adaptor.

FIG. 15 is a detail is the sprocket adaptor. Sprocket adaptor 20 comprises receiving portions 21. Spokes 22 extend from outer ring 23 to inner ring 24. Bolts 11 engage sprocket adaptor 20 through holes 25 in outer ring 23. Wheel shaft 60 extends through inner ring 24. Spokes 22 interlock the sprocket adaptor 20 with the wheel adaptor 30 so the adaptors cannot be pulled apart by operation of the isolator coupling.

Blocks 50 are disposed within receiving portions 21 between members 32 and spokes 22. During operation torque is transmitted from members 32 through blocks 50 to spokes 22.

Figure 3:
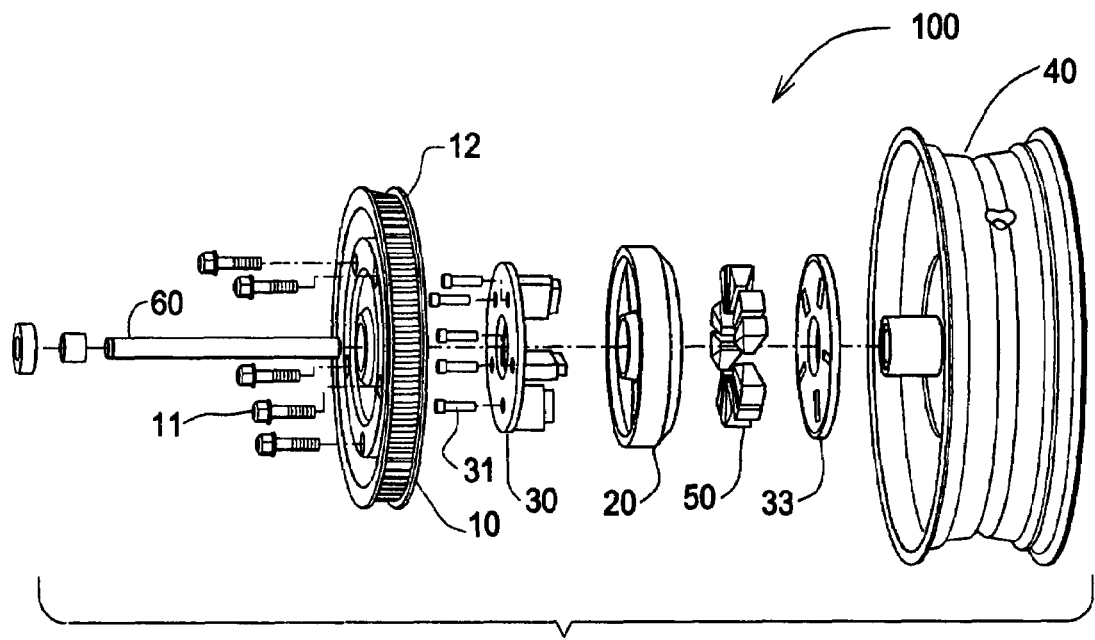
FIG. 3 is an exploded view of an alternate embodiment.

In an alternate embodiment a wheel adaptor cap 33 on the wheel side is shown in FIG. 3. FIG. 3 is an exploded view of an alternate embodiment. Instead of using a wheel side wall as working surface of the isolator as shown in FIG. 1, the wheel adaptor cap 33 is used. In this embodiment cap 33 is pressed onto the wheel adaptor 30 by an interference fit between the member 32 and the open slot 34, see FIG. 16. However, it is possible to make the connection using other suitable mechanical means such as with a fastener (bolt) or welding.

Figure 4:
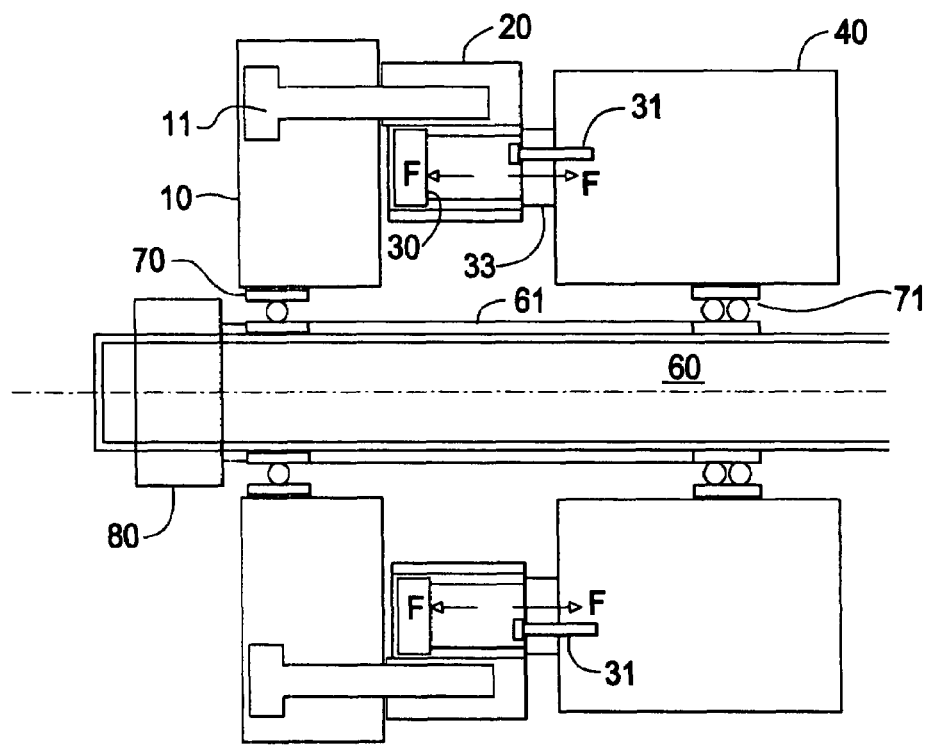
FIG. 4 is a cross sectional view of the alternate embodiment in FIG. 3.

FIG. 4 is a cross sectional view of the alternate embodiment in FIG. 3.

Figure 16:
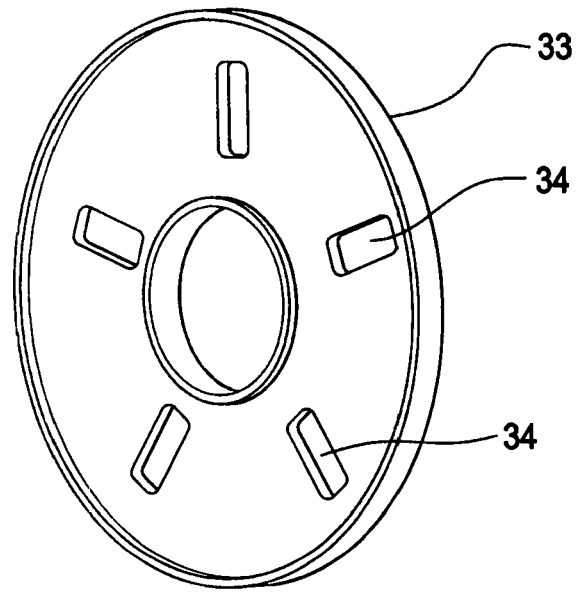
FIG. 16 is a perspective view of the wheel adaptor cap.

FIG. 16 is a perspective view of the wheel adaptor cap. Slots 34 are equally spaced about wheel cap 33. Although each wheel cap is shown extending radially, any shape for slot 34 would be suitable.

Figure 5:
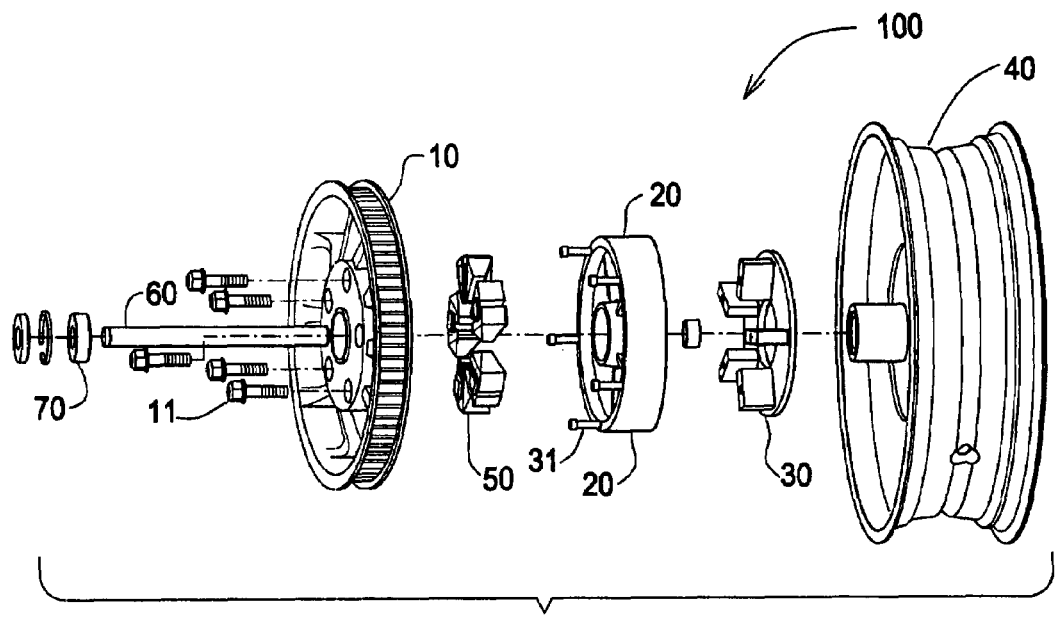
FIG. 5 is an exploded view of an alternate embodiment.

FIG. 5 is an exploded view of an alternate embodiment. By mounting the sprocket adaptor 20 directly onto wheel 40 using bolts 31 instead of to sprocket 10, the arrangement is substantially reversed from the sequence in FIG. 1.

Figure 6:
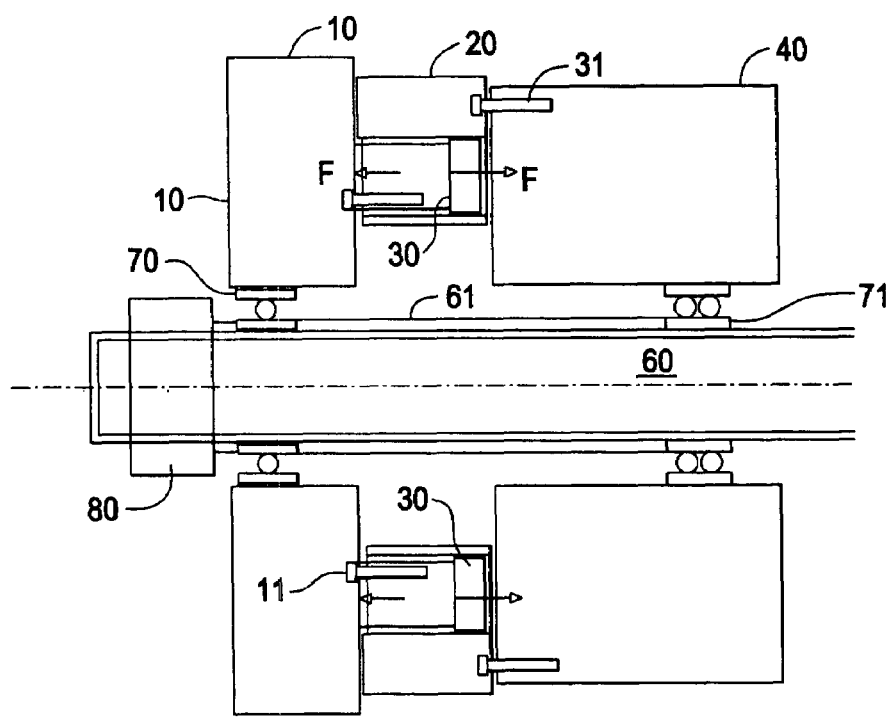
FIG. 6 is a cross sectional view of the alternate embodiment in FIG. 5.

FIG. 6 is a cross sectional view of the alternate embodiment in FIG. 5. In this embodiment wheel adapter 30 is fixedly connected to sprocket 10 using bolts 11. Sprocket adaptor 20 is fixedly connected to wheel 40 using bolts 31. Wheel adaptor 30 is axially held in engagement with sprocket adapter to spokes 22 (see FIG. 15).

Figure 7:
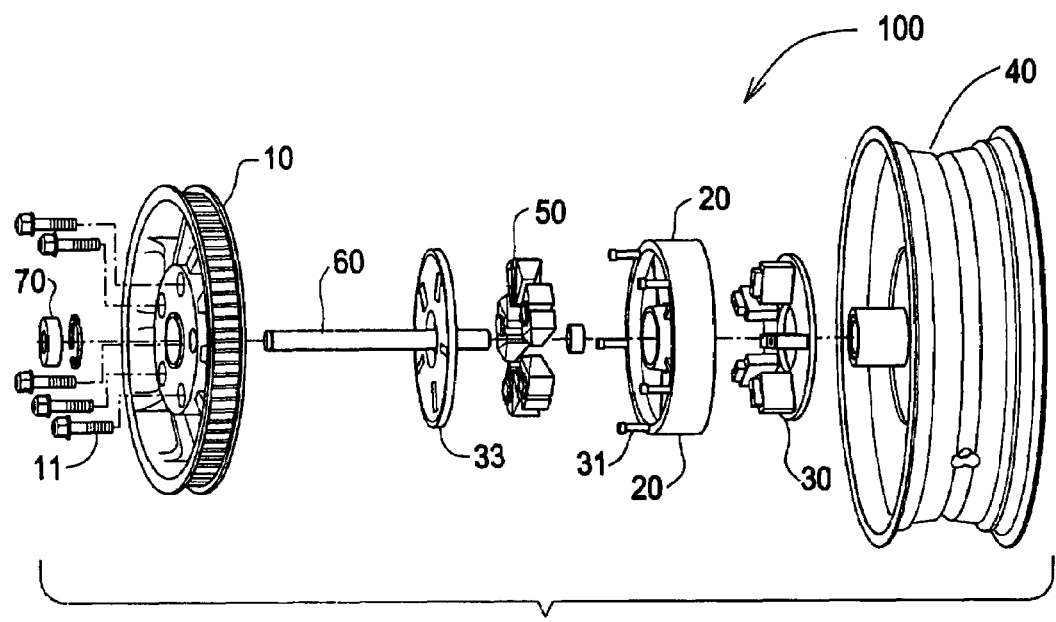
FIG. 7 is an exploded view of an alternate embodiment.

FIG. 7 is an exploded view of an alternate embodiment. This embodiment is the same as described in FIG. 5 with the exception that in this embodiment wheel cap 33 is disposed between sprocket adaptor 20 and sprocket 10.

Figure 8:
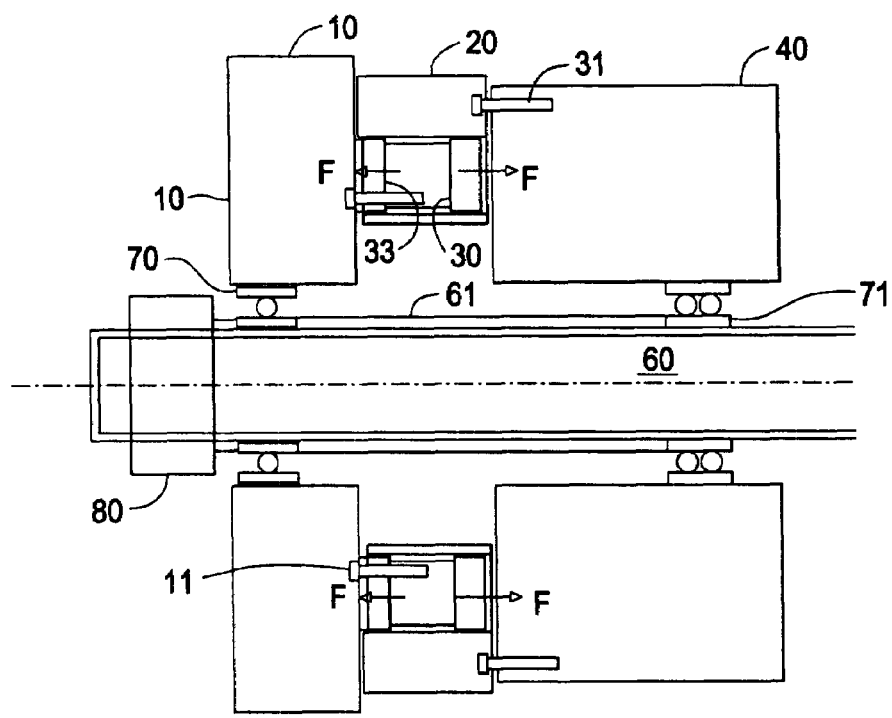
FIG. 8 is a cross-sectional view of the embodiment in FIG. 7.

FIG. 8 is a cross-sectional view of the embodiment in FIG. 7. Sprocket adaptor 20 is fixedly connected to wheel 40 using bolts 31.

Figure 9:
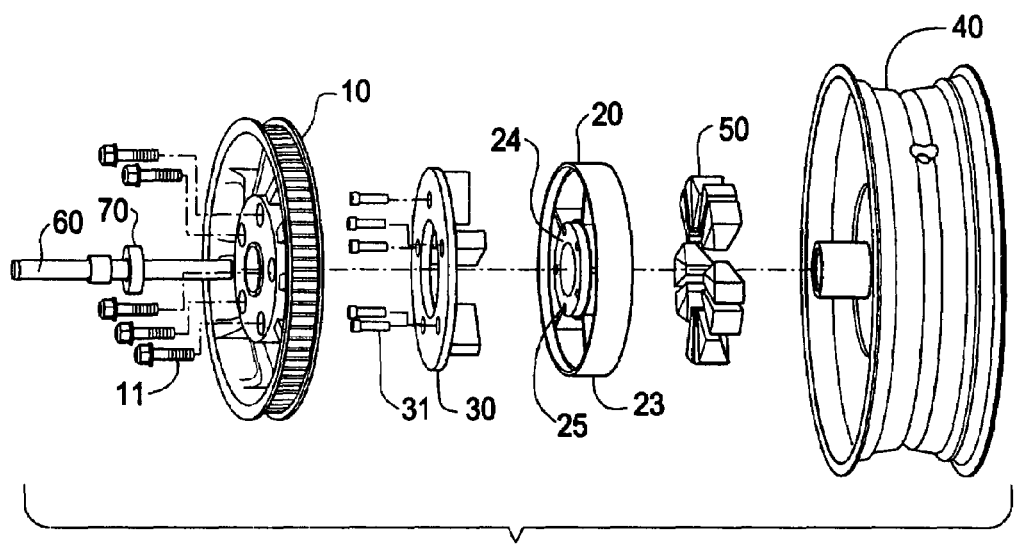
FIG. 9 is an exploded view of an alternate embodiment.

FIG. 9 is an exploded view of an alternate embodiment. This embodiment is the same as described in FIG. 1 with the exception that holes 25 are disposed on inner ring 24 instead of on outer ring 23.

Figure 10:
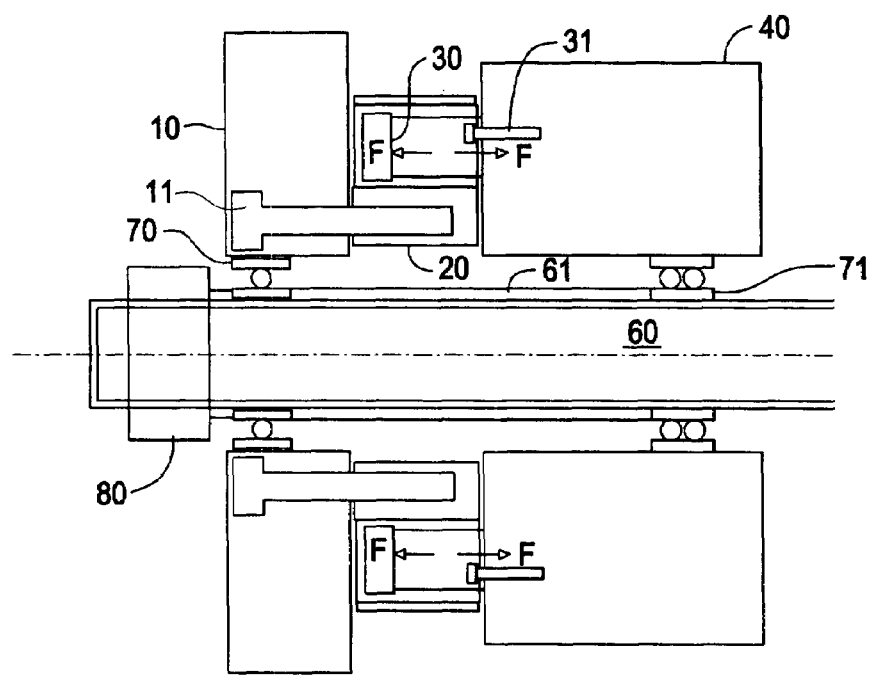
FIG. 10 is a cross sectional view of the embodiment in FIG. 9.

FIG. 10 is a cross sectional view of the embodiment in FIG. 9.

Figure 11:
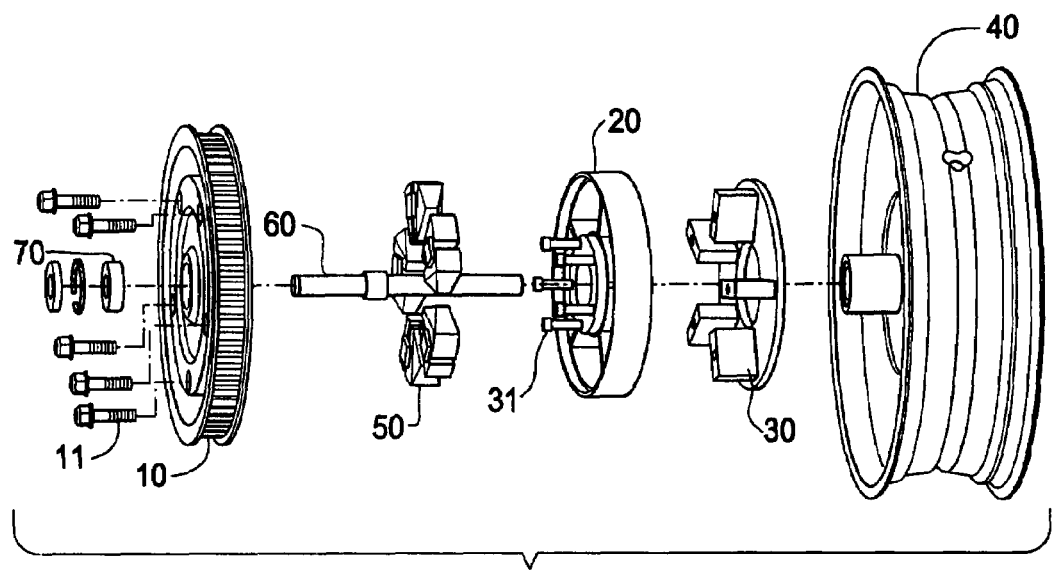
FIG. 11 is an exploded view of an alternate embodiment.

FIG. 11 is an exploded view of an alternate embodiment. This embodiment is the same as described in FIG. 5 with the exception that holes 25 are disposed on inner ring 24 instead of outer ring 23.

Figure 12:
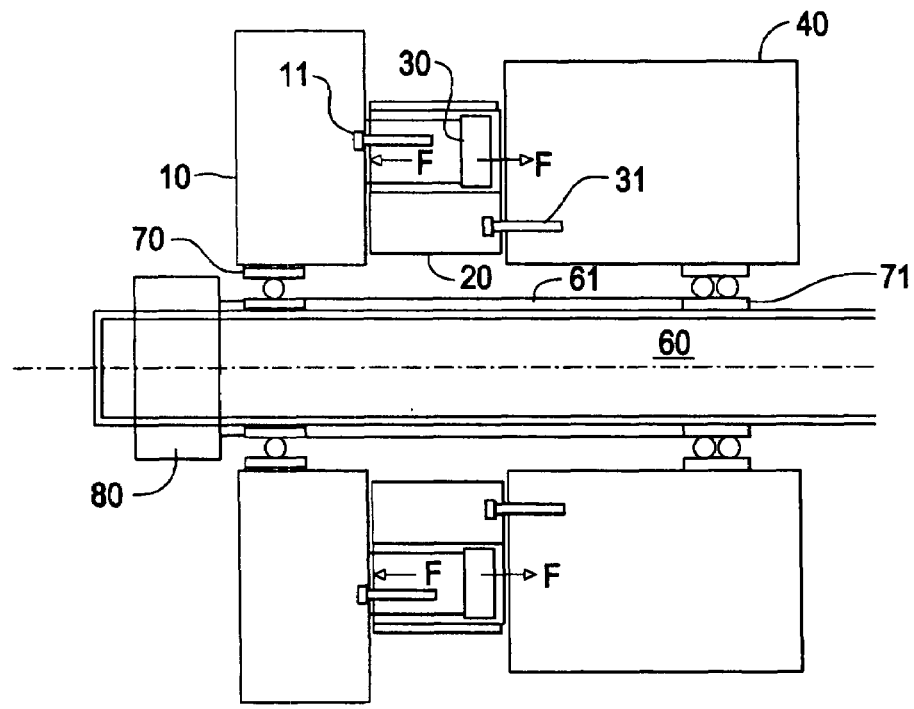
FIG. 12 is a cross sectional view of the embodiment in FIG. 11.

FIG. 12 is a cross sectional view of the embodiment in FIG. 11.

Figure 13:
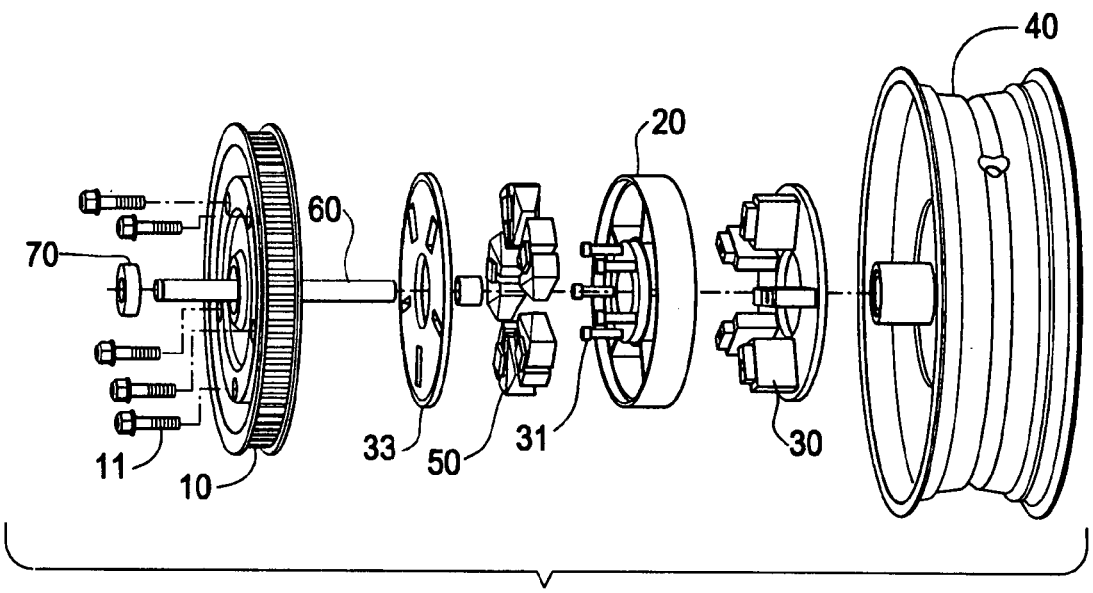
FIG. 13 is an exploded view of an alternate embodiment.

FIG. 13 is an exploded view of an alternate embodiment. This embodiment is the same as described in FIG. 11 with the exception that wheel cap 33 is disposed between sprocket adaptor 20 and sprocket 10.

Figure 14:
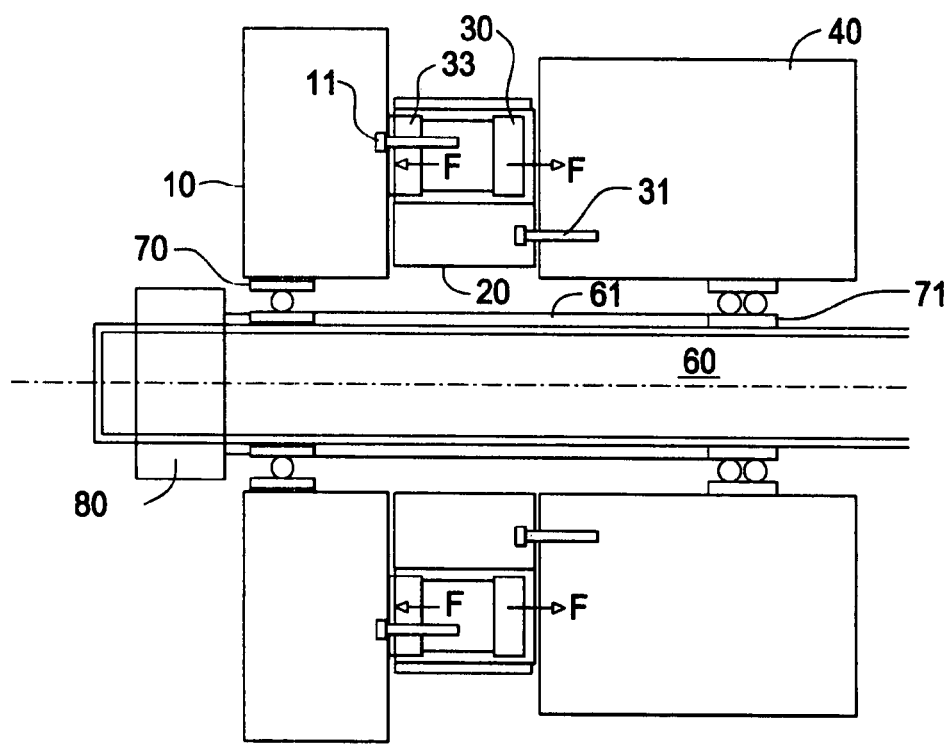
FIG. 14 is a cross sectional view of the embodiment in FIG. 13.

FIG. 14 is a cross sectional view of the embodiment in FIG. 13.

Figure 17:
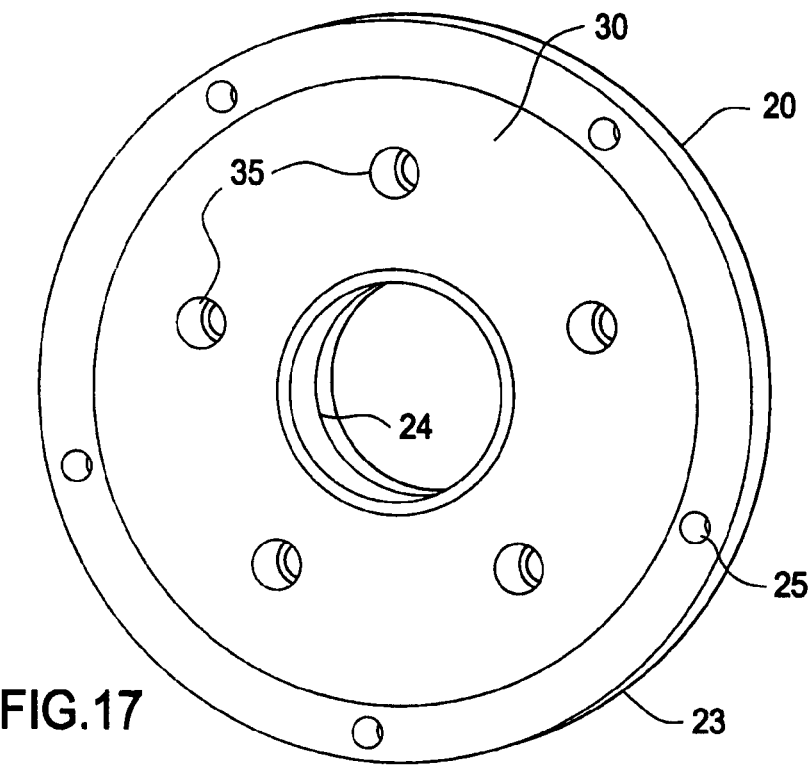
FIG. 17 is a detail of FIG. 1.

FIG. 17 is a detail of FIG. 1. This detail is as viewed from the sprocket perspective. Wheel adaptor 30 is shown engaged with sprocket adaptor 20. Holes 25 receive bolts 11. Holes 35 receive bolts 31.

Figure 18:
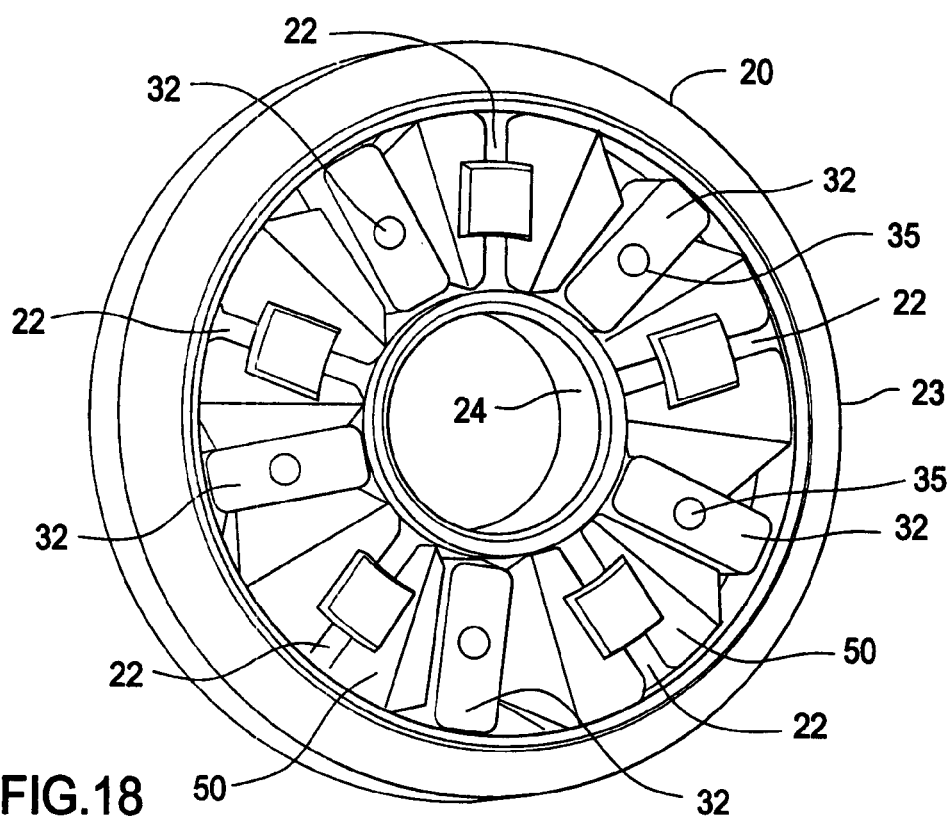
FIG. 18 is a detail of FIG. 1.

FIG. 18 is a detail of FIG. 1. This detail is the opposite side of the view in FIG. 17 as viewed from the wheel perspective. Blocks 50 are contained within receiving portions 21 and are shown on either side of spokes 22. Members 32 are disposed between each section of adjacent blocks 50. Bolts 31 project through holes 35 to fasten wheel adaptor 30 to the wheel 40 (not shown). In so doing the sprocket adaptor 20 and blocks 50 are held between the wheel adaptor 30 and wheel 40.

Driving torque is transmitted from a belt to the sprocket 10 and then to the sprocket adaptor 20 to spokes 22 and then to each block 50 and then to each member 32 and then to the wheel 40. Downshift and engine braking torque is transmitted in the opposite direction.

The detail shown in FIGS. 17 and 18 describe the isolator coupling as a stand alone unit. This means the isolator can be used on any wheel and sprocket combination, so long as the sprocket is fastened to the sprocket adaptor 20 and the wheel is fastened to the wheel adaptor 30.

Although forms of the invention have been described herein, it will be obvious to those skilled in the art that variations may be made in the construction and relation of parts without departing from the spirit and scope of the invention described herein.

We claim:

1. A wheel isolator coupling comprising:
   a sprocket for engaging a drive member, the sprocket fixedly connected to a first adaptor;
   the sprocket rotationally engaged with a shaft through a first bearing;
   a wheel portion fixedly connected to a second adaptor;
   the wheel portion rotationally engaged with the shaft through a second bearing;
   the first adaptor having at least one receiving portion;
   at least one compressible member disposed within the receiving portion;
   the second adaptor having a radially extending member for engaging the compressible member within the receiving portion; and
   the sprocket imparting no axial force to the first bearing.

2. The wheel isolator coupling as in claim 1 further comprising:
   a cap connected to the second adaptor;
   the cap disposed on an opposite side of the first adaptor from the second adapter.

3. The wheel isolator coupling as in claim 1, wherein the drive member has a toothed surface.

4. The wheel isolator coupling as in claim 1 further comprising a plurality of compressible members.

5. The wheel isolator coupling as in claim 1, wherein the first adaptor further comprises a member for interlocking the first adaptor with the second adaptor.

* * * * *